Inventor
Steve Kovac, Jr
by Parker & Carter
Attorneys 2,912,111
Patented Nov. 10, 1959

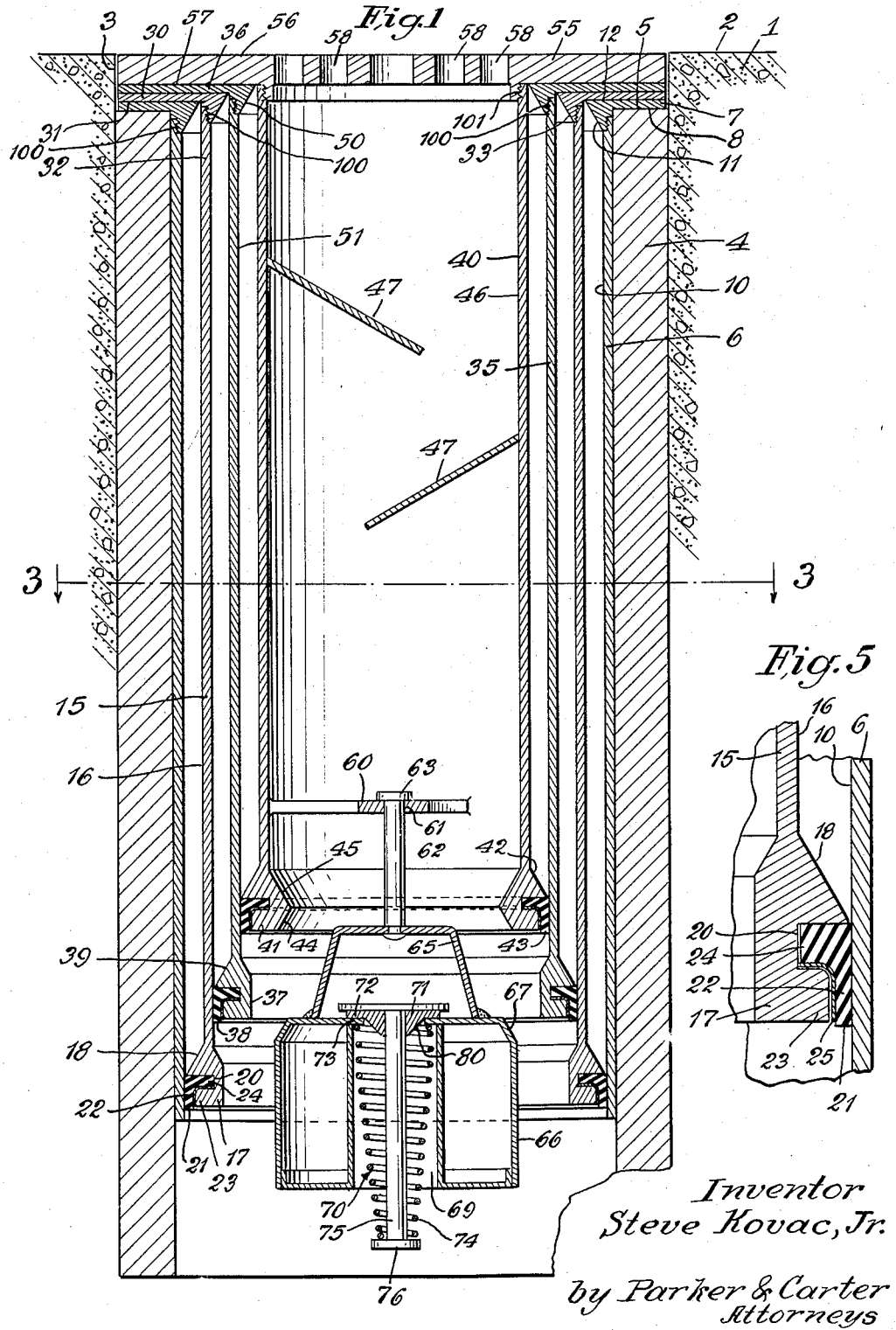

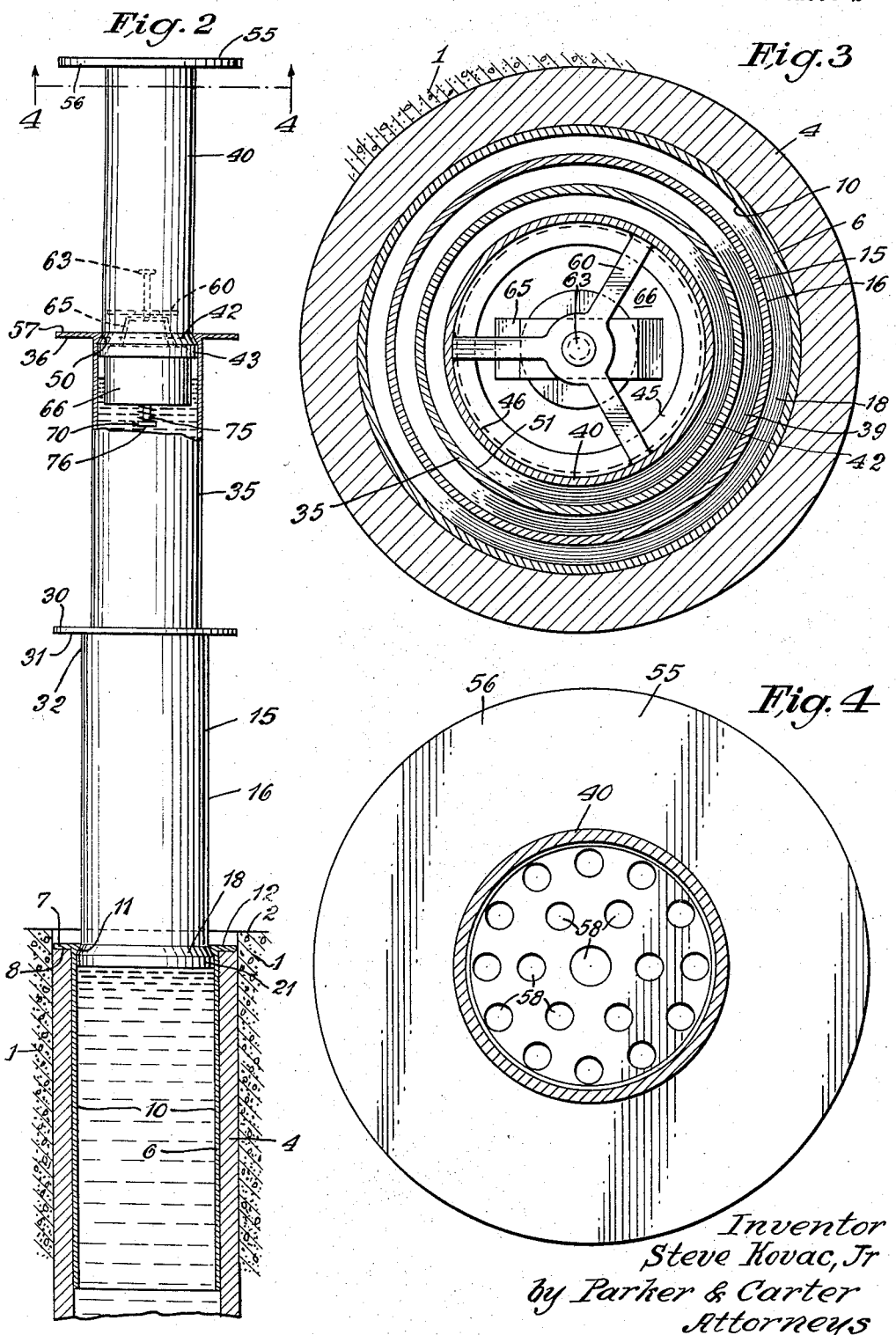

2,912,111

AUTOMATIC EXTENSIBLE STANDPIPE

Steve Kovac, Jr., Chicago, Ill., assignor to Sewer-O-Matic, Inc., a corporation of Illinois Application February 15, 1955, Serial No. 488,364

3 Claims. (Cl. 210—119)

This invention relates to means for preventing the overflow of fluid and has particular relation to automatic means for preventing such overflow.

From time to time mechanisms adapted for the carrying off of fluids, for example, sewers arranged to carry off water from a building, will fill with such fluid and will "back up" to a point where an overflow into the building may occur. The most common example is the drain in the floor of a household basement. Upon occasion of unusually heavy rainfall, for example, the water will back up through the sewer and will flow into the basement. Various means have been provided in the past to cope with the problem. One such known means involves the use of a sump pump which automatically draws off the water flowing onto the basement floor, but such mechanisms are expensive. Another known means consists primarily of a length of pipe which is secured to the sewer and which extends upwardly above the basement floor a distance deemed sufficient to reach somewhat above the expected water level. Such solid lengths of pipe so arranged, however, prevent the use of the drain when installed and constitute an obstruction rising above the floor level. As a consequence, such fixed lengths of pipe are normally not installed, the owner relying upon sufficient warning to install them before possible overflow conditions occur. Since such conditions occur often when the owner is not present in the vicinity or when such owner is asleep, this last-named device is not considered completely satisfactory. Further, such standpipes require the use of threaded metal sewer pipe, yet a vast number of homes are equipped with non-threaded clay pipe sewers. Simple check valves have also been provided which permit flow of fluid in one direction, i.e. to drain but absolutely prevent flow in the opposite direction, i.e. they prevent any "back up" flow. The objection to such check valves, however, is that they are also installed in threaded iron drain pipes and that the pressure of the water created thereagainst may be such as to result in breakage of the sewer pipe or other drainage means.

Accordingly, it is one purpose of my invention to produce a device which shall be economical and simple to manufacture and to install and which shall, at the same time, be effective to prevent overflow of fluid draining installations.

Another purpose of my invention is to provide an overflow-preventing device which shall operate automatically upon the occurrence of overflow-creating conditions.

Another purpose of my invention is to provide an overflow-preventing device which shall operate automatically in response to overflow-creating conditions to prevent such overflow.

Another purpose of my invention is to provide an overflow-preventing device which shall be effective to prevent overflow under a predetermined set of conditions but which shall be also effective to permit such overflow upon the occurrence of separate predetermined conditions.

Another purpose is to provide an overflow-preventing device which may be utilized also as a drain device when overflow-creating conditions are not present.

Another purpose of my invention is to provide an automatically operating, economically manufactured and installed in presently-existing drain mechanisms without substantial modification of the latter.

Another purpose is to provide an automatic overflow-preventing device incorporating a normally closed valve operable in response to the normal drainage of fluid to open said valve.

Another purpose is to provide a device for sewers and the like having a normally closed valve and means for manually opening said valve, said means comprising also indicator means to indicate the position of said valve.

Other purposes will appear from time to time in the course of the specification and claims.

The present application is a continuation in part of my application Serial No. 465,916 filed November 1, 1954 for Automatic Extensible Standpipe now abandoned.

I illustrate my invention more or less diagrammatically in the accompanying drawings, wherein:

Figure 1 is a side view in cross section;

Figure 2 is a side elevation in partial cross section on a reduced scale and illustrating my device in overflow-preventing condition;

Figure 3 is a view taken on the line 3—3 of Figure 1;

Figure 4 is a view taken on the line 4—4 of Figure 2 on an enlarged scale;

Figure 5 is a detail view in cross section on an enlarged scale illustrating a sealing means employed in my invention;

Like parts are indicated by like symbols throughout the specification and drawings.

Figures 6, 7:
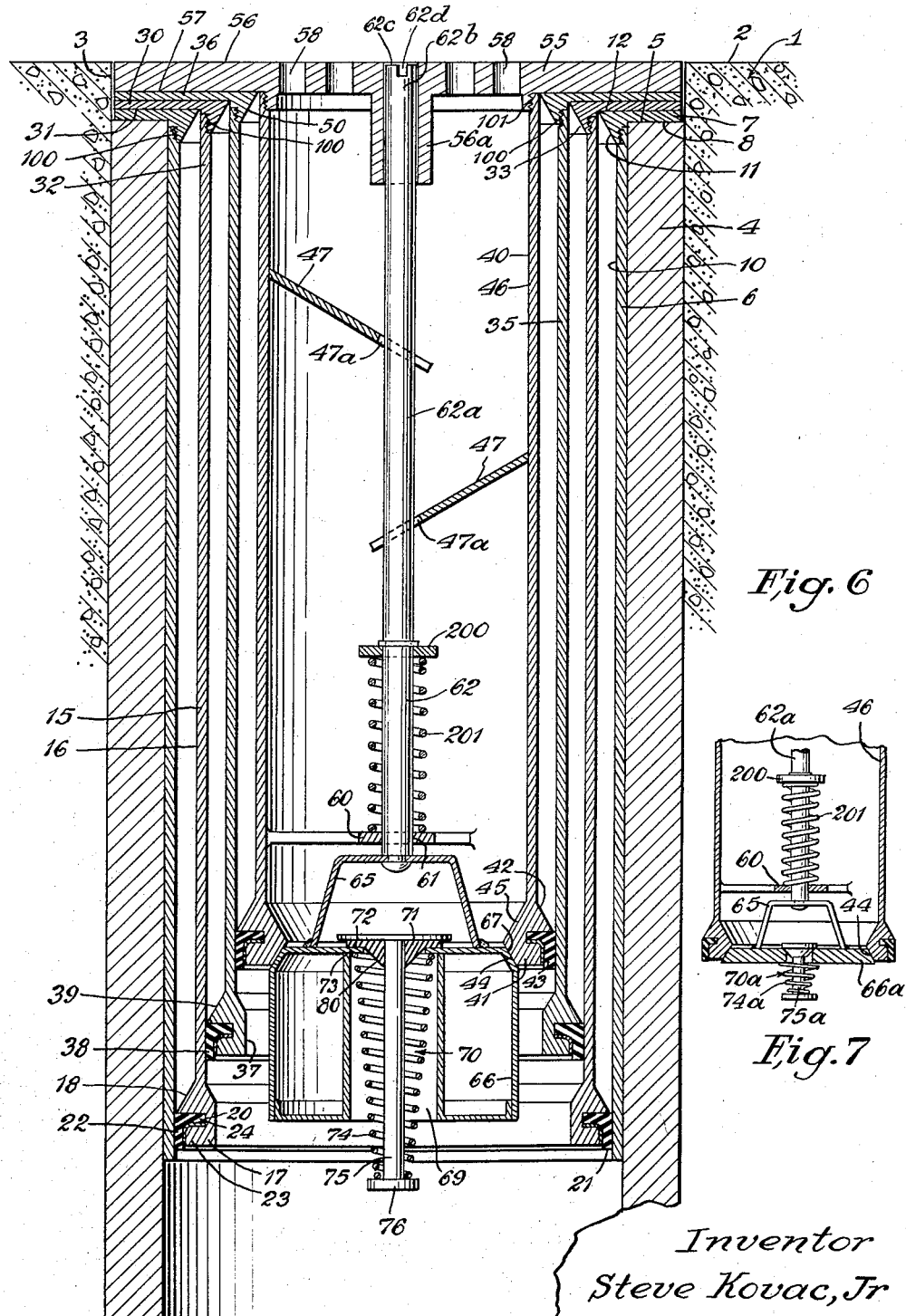
Figure 6 is a side view in cross section and illustrating a variant form of my invention.
Figure 7 is a detail view illustrating a variant form of valve usable with the device of Figure 6.

Referring now to the drawings and particularly to Figure 1, the numeral 1 generally indicates a portion of a building, for example, a basement floor, the top or floor surface of which is indicated generally by the numeral 2. An opening 3 may exist in the floor 1 and may have fixed therein a drain mechanism, such as the sewer pipe, generally indicated by the numeral 4. The top edge 5 of the pipe 4 is spaced downwardly somewhat from the floor surface 2. It will be realized that in such structures such downward spacing of the top edge 5 exists to provide space for a drain screen normally formed of metal which may seat upon the edge 5 within the opening 3 and may have its upper surface flush with the floor surface 2.

Positioned within the pipe 4 and constituting a cylindrical, hollow liner therefor is the liner member 6. The liner 6 may have an outwardly extending, annular flange 7 at its upper edge and the lower surface 8 of the flange 7 may rest upon the upper edge 5 of the pipe 4. The inner wall surface 10 of the liner 6 may be inwardly, conically offset adjacent its upper edge as at 11. The inwardly, upwardly conical edge 11 may joint the upper, annular surface 12 of the flange 7 which extends across the liner wall surface 10 a distance sufficient to meet the conical wall 11. The liner member 6 may be secured in any suitable manner in position with relation to the pipe 4.

Slidably mounted within the liner wall 10 is the hollow, generally cylindrical section member 15. The member 15 may have an outer cylindrical surface 16 spaced inwardly from the wall surface 10 of the member 6. Adjacent its lower edge, the tubular section member 15 may have an annular enlargement 17. The enlargement 17 may have a downwardly, outwardly conical upper wall surface 18. Adjacent the lower edge of the wall surface 18, the enlargement 17 may have a channel 20 in which is seated a sealing means 21, which may comprise, for example, a rubber, generally cylindrical portion 22, which may be clamped between the inner wall surface 10 of the liner 6 and a lower, cylindrical portion 23 of the enlargement 17. The remaining portion 24 of the sealing means 21 may be seated within the channel 20. A pressure member 25 may be positioned between the sealing member 21 and the enlargement portion 23, as shown generally at 25 in Figure 5, and may consist, for example, of a metallic expansion spring member.

The section member 15 may have, adjacent its upper edge, an outwardly extending, annular flange portion 30, the lower surface 31 of which seats upon the upper surface 12 of the flange 7. Similarly, the member 15 may be adjacent the upper edge of its inner wall surface 32 the upwardly, inwardly conical, offset inner wall portion 33.

Slidably mounted within the hollow, tubular member 15 is a second tubular member 35, which corresponds generally in shape though in lesser diameter with that of the member 15. The upper, annular flange 36 of the member 35 corresponds generally with the flanges 30 and 7 of the members 15 and 6 respectively, except that it may be longer than the flange 30, just as the flange 30 is longer than the flange 7 when it is desired to have the three flanges extend to a position adjacent the walls of the opening 3, or, in other words, to have the diameter of the flanges 36, 30 and 7 generally equal to the outer diameter of the pipe 4 and inner diameter of the pipe 3. The member has adjacent its lower edge the enlargement 37 with its sealing means 38, which correspond generally with the enlargement 17 and sealing means 21, as above-described in relation to the member 15. It will be observed that the member 35 is of less extension than the member 15 and that, accordingly, its enlarged lower edge portion is positioned above the corresponding portion of the member 15. The enlargement 37 has a downwardly, outwardly, conical wall surface 39 corresponding generally with the surface 18 on the enlargement 17 of the member 15.

Slidably mounted within the cylindrical member 35 is the inner, generally hollow, cylindrical tube section 40. The section 40 has a lower end enlargement 41, the outer surface of which includes the downwardly, outwardly, conical, upper wall surface 42 corresponding generally with the surfaces 39, 18, above-described. The enlargement 41 carries the sealing structure 43, which corresponds generally with the structure indicated by the numerals 20—24, described above in relation to the end enlargement 17. The inner surface of the enlargement 41 is formed somewhat differently from the inner surfaces of the enlargement 37, 17 in that the inner surface of the enlargement 41 includes a lower, generally upwardly, inwardly conical surface 44, the purpose of which will appear hereinafter, and an upper conical portion 45.

The inner cylindrical wall surface 46 of the member 40 may have secured thereto a number of deflector members 47, which may extend in angular planes within the hollow member 40.

It will be observed that the member 35 carries adjacent its upper edge the inwardly, upwardly, conical, offset portion 50 and that the angular relationship of the surface 50 with the inner cylindrical wall surface 51 of the member 35 corresponds to the angular relationship of the enlargement surface 42 therewith.

A drain screen is indicated generally at 55. The screen 55 may, when desired, be a generally circular plate with an annular, outer edge portion 56 resting upon the upper surface 57 of the flange 36 on the member 35. A plurality of axially-disposed apertures 58 may be formed in the screen 55 in general alignment with the area encompassed by the inner cylindrical member 40. The member 40 may be secured to the under surface of the drain plate 55 in any suitable manner after the device has been assembled.

A spider 60 may have its radial arms secured to the inner surface 46 of the member 40 adjacent the lower end enlargement 41 and spaced upwardly therefrom. Movably mounted within a central aperture 61 in the spider 60 is a pin member 62 having a head portion 63 positioned above the spider 60 and of sufficient area to overlie the spider 60 about the opening 61. Secured to the lower end of the pin 62 is a bracket member 65, which may be generally in the shape of an inverted U, the lower ends of which may be connected to a float member 66. While a hollow metal float 66 is illustrated, it will be realized that the float 66 could be formed of a variety of materials without departing from the nature and scope of my invention. The float 66 has the generally upwardly, inwardly, conical, upper edge surface 67, the angular relationship of which, with the vertical axis of the member 40, corresponds to that between the surface 44 on the enlargement 41 with the vertical axis of the member 40. The float 66 may have the generally axially located passage 69 extending therethrough and a check valve mechanism, generally indicated by the numeral 70, may be positioned within the passage 69. As an example, I illustrate the valve portion 71 having a lower valve face 72 which is urged upon its seat 73 by a spring member 74 surrounding the valve stem 75 and compressed between the stem enlargement 76 and the lower surface of the valve seat 73 which may, for convenience, be a portion of the upper wall of the float 66 positioned about the opening 69. The valve portion 71 may have the downwardly and inwardly conical portion 80 generally centrally located thereon to insure the proper seating of the valve face 72 on the seat 73.

It will be realized that, whereas I have described and illustrated a practical and operative device, nevertheless, many changes may be made in the size, shape, number and disposition of parts without departing from the spirit of my invention. I therefore wish my description and drawings to be taken as, in a broad sense, illustrative or diagrammatic, rather than as limiting me to my precise showing. For example, the annular flanges 7, 30, 36, with their inward conical surfaces 11, 33, 50, respectively, are shown at 100 as being threadedly secured to the liner 6 and hollow tube sections 15 and 35 and the drain screen 55 is shown at 101 as threaded upon the tube section 40, but it will be realized that these members may be secured together in any suitable manner without departing from the nature and scope of my invention.

The use and operation of my device are as follows:

As fluid, such as water, begins to "back up" through a drainage means, such as the sewer pipe 4, the water first contacts the float 66, which, as best seen in Figure 1, extends below the lower end enlargement 17 of the member 15. As the water continues to rise, it forces the float upwardly until the float surface 67 contacts the surface 44 of the member 40, forming a watertight seal therebetween.

As the water continues to rise and to exert upward pressure against the float 66, the float 66 is caused to rise further and to carry with it, in an upward direction, the member 40.

Should the water continue to rise, it will bring the surface 42 on the member 40 into contact with the conical surface 50 of the tube section 35, and, as the water continues to exert upward pressure against the float 66 and through it against the member 40, it will cause the member 40 to carry upwardly with it the member 35.

The above-described process is repeated as the water continues to rise and the surface 39 on the member 35 is brought into contact with the surface 33 on the member 15. Continued rise of the water will cause, finally, the surface 18 to come into contact with the surface 11 on the liner member 10.

While three slidably movable, tubular standpipe structures are illustrated in the drawings, it will be realized that the number of such sections and the length thereof may be varied without departing from the nature and scope of my invention.

Figure 1 illustrates my extensible standpipe in telescoped or draining position, and Figure 2 illustrates my device in extended or overflow-preventing position.

Should the water continue to rise after the surface 18 has been brought into contact with the surface 11, or, in other words, after the lower edge of the outermost movable pipe section has been brought into contact with a stop means adjacent the upper edge of a pipe, such as sewer pipe 4, there must be a provision for permitting continued rise of the water to occur in order to prevent the creation of pressure within the sewer pipe beyond a given amount.

Accordingly, I provide the channel 69 in the float 66 and the spring-loaded valve 71. The water will be held beneath the float 66, as illustrated in Figure 2, until such time as the pressure thereof rises to a point considered dangerous to the sewer pipe 4 or other drainage mechanism. At this point, the spring 74 will be overcome and the valve 71 will open to release such pressure and to allow water to flow upwardly into the member 40. The deflectors 47, which may be provided when desired, are effective to slow down any possible rush of water through the member 40. Should the member 40 become filled, the apertures 58 permit the water to flow out of the member 40. It will be understood, however, that sufficient telescoping, tubular sections, similar to the sections 15, 40, are provided and that they are of sufficient length to reach, when extended, to a level above that which might be expected to occur in the area and that such overflow through the apertures 58 will rarely, if ever, occur. The device could be arranged, for example, to permit the apertures 58 to be raised to a level above the level of the ground, in which case an overflow would be created through the apertures 58 when the device is extended only under circumstances wherein a flood level above the ground would be created, in which case flooding of the basement or other structure in which my device may be installed would have occurred in any case.

When my device is in the position illustrated in Figure 1, water may be drained from the floor surface 2 through the aperture 58 and downwardly through the member 40, between the ribs or radial arms of the spider 60 and about the float 66 without difficulty and essentially in the normal manner. Where a larger drainage area is desired, it will be realized that the pipe 4 could be cut away adjacent the lower edge of the liner 6 and that the diameter of the liner 6 and members 15, 35, 40 could be enlarged, and my device could be positioned about the upper edge of the pipe 4 within an enlarged opening 3 in the floor 1 without departing from the nature and scope of my invention.

Similarly, when the vertical portion 4 of the sewer pipe is of sufficient extension beneath the floor surface 2, a single standpipe section 40 with its float means may be movably or slidably supported within such vertical portion, the intermediate sections 15 and 35 being dispensed with under such circumstances. Since such drainage vertical portion is rarely over a matter of inches in length, however, I find it preferable to provide a plurality of nested, concentric hollow tube sections, as illustrated in Figures 1, 2, and 3.

Referring now to Figure 6, I illustrate a variant form of my invention. In this form, the stem 62 may be provided with an upward extension 62a. The extension 62a has an upper terminal portion 62b loosely positioned within a hollow sleeve or boss 56a depending centrally from the drain plate 56. As illustrated in the drawing, the upper end 62c of the extension 62a is flush with the drain cover 56 when the flow valve is in closed position and a slot 62d may be provided in the end 62c, the purpose of which will appear hereinbelow. The pin extension 62a may be guided intermediate its ends by slots 47a formed in the inner portions of the fluid deflectors 47. A spring-retaining flange 200 may be secured to and annularly extending from the pin 62, and a light spring 201 may surround the pin 62 and may be positioned between the spider 60 and the flange 201. The remaining structure illustrated in Figure 6 corresponds to the structure shown in Figures 1–5.

As illustrated in Figure 6, the spring 201 is effective to maintain the float 66 in engagement with its seat 44. Since the float is thus normally seated, the drain is, in effect, closed, thus sealing off the area above the drain from sewer gases, insects, etc. Similarly, since the float valve is normally seated, no opportunity is permitted for any back-flowing water to get behind the float valve and thus prevent its reaching its seat. Similarly, the seat is protected against the pressure of foreign matter which might be caught between the float valve and the seat upon initiation of back flow and which might thereby prevent the float from completely seating, which would, of course, fail to prevent an overflow.

The spring 201, however, is set so as to exert a predetermined force to insure that, upon the normal drainage of water downwardly through the inner tubular member 46, the weight of the water above the float 66 will be such as to overcome the resistance of spring 201 to open the float valve and permit the drainage of water downwardly through the device.

Should it occur that the float valve illustrated in Figure 6 would become stuck to its seat 44 as a result of long periods of nonuse, for example, and should water thereby be prevented from draining downwardly through the member 46, the person attempting to drain the water, as might occur for example upon the occasion of washing a basement floor, has only to press downwardly on the end 62c of the pin extension 62a to unseat the float 66 to permit drainage of water through the member 46. Similarly, if any foreign material is carried downwardly with the drainage water and if such material should be deposited on the seat 44 or the seating surface 67 of the float 66, thus holding the float off its seat, the spring 201 will be prevented from returning the float valve to seated position and the end 62c will not return to a position flush with the top of the drain cover 56, thus indicating to the person who has just finished draining the water through the tube 46 that the valve has not returned to its seat. A tool may then be inserted in the slot 62d and the stem and float valve may be thereby rotated to dislodge any material between the mating surfaces of the valve and its seat.

It will be realized further that the provision of an extensible flow control standpipe permits the ready inspection of the float valve and the seat as well as the seals 22, 38, 43 when the device is formed of a transparent plastic. All that is necessary is that the members be manually moved to the extended position illustrated in Figure 2 and the entire mechanism may then be thoroughly inspected. It will be realized further that the concept illustrated in Figure 6 may be employed with a variety of valves without departing from the nature and scope of my invention, but, for convenience, I illustrate in Figure 6 the valve-mating surface 67 and the float 66 as shown in the earlier figures. For example, in Figure 7 I illustrate on a reduced scale a variant form of valve, such as the valve 66a. It may also be advisable to provide means for sealing the springs 201 and 70 against the corrosive action of the fluid with which they would come in contact and from foreign material in such fluids, and such seals could be provided without departing from the nature and scope of my invention, the present showing being merely diagrammatic,

I claim:

1. An automatic overflow control device for sewers and the like comprising a plurality of telescoped hollow tubular members, an apertured drain plate carried by the upper cylindrical edge of the innermost tubular member, an elongated stem extending axially through the innermost of said tubular members and having its upper end adjacent the upper surface of said drain plate, a main valve member carried by and at the opposite end of said stem, said innermost tubular member having a valve seat formed at its lower cylindrical edge, yielding means operable against said stem and said innermost tubular member and effective to maintain said main valve member on said seat, said main valve member being effective to seal said innermost tubular member against an upward flow of fluid thereinto, a second valve positioned in said main valve member and yielding means effective to urge said second valve toward a seat formed therefor in said main valve member said second valve being formed and adapted to move off its seat in response to the upward flow of liquid at a predetermined pressure against said main valve member and to permit fluid flowing at said pressure to enter said innermost tubular member.

2. The structure of claim 1 characterized by and including a tool-engageable conformation at the upper end of said stem and accessible through said drain plate, said stem and main valve member carried thereby being rotatably supported by said innermost tubular member whereby said stem and main valve member can be rotated in response to rotation of said tool-engageable conformation.

3. The structure of claim 2 wherein the upper end of said stem is yieldingly urged into a position adjacent the upper surface of said drain plate by said yielding means when said main valve member is on its seat.

References Cited in the file of this patent

UNITED STATES PATENTS

| | | |
|---|---|---|
| 234,209 | Slye | Nov. 9, 1880 |
| 1,197,377 | Kluin | Sept. 5, 1916 |
| 1,643,818 | Manning | Sept. 27, 1927 |
| 1,982,555 | Van Der Horst | Nov. 27, 1934 |
| 2,478,976 | Modlin | Aug. 16, 1949 |

FOREIGN PATENTS

| | | |
|---|---|---|
| 92,086 | Sweden | Apr. 21, 1938 |